United States Patent [19]
Koeniger

[11] 3,794,429
[45] Feb. 26, 1974

[54] DEVICE FOR INSPECTING EYE-CONTACTING SURFACES OF CONTACT LENSES

[76] Inventor: Erich A. Koeniger, 5600 Bridget St., New Orleans, La. 70002

[22] Filed: Oct. 6, 1972

[21] Appl. No.: 295,745

[52] U.S. Cl................ 356/124, 356/156, 356/209, 356/237
[51] Int. Cl. ............................................ G01b 9/00
[58] Field of Search ... 356/124, 120, 156, 164, 165, 356/166, 168, 171, 200, 209, 212, 237, 239, 256; 350/284, 178

[56] References Cited
UNITED STATES PATENTS
2,798,966    7/1957    Summerhayes, Jr................ 356/237

Primary Examiner—John K. Corbin
Assistant Examiner—Conrad Clark
Attorney, Agent, or Firm—James B. Lake, Jr.

[57] ABSTRACT

A closed device in which interior illumination is wholly provided and controllable to dimly and diffusively illuminate a contact lens from above, and slantingly and more brightly illuminate it from below. Magnification optics are positioned in the device to direct a line of sight, slantingly upward and approximately normal to the slanting illumination from below, to but not through a part of the inner peripheral eye-contacting surface of a contact lens, whereby malformations in said surface are magnified by said optics to be plainly seen in profile and not looked through without seeing.

6 Claims, 5 Drawing Figures

DEVICE FOR INSPECTING EYE-CONTACTING SURFACES OF CONTACT LENSES

The invention relates generally to a device for the inspection of lenses, and more particularly to inspecting concave peripheral eye-contacting surfaces of contact lenses for malformations.

A contact lens is shaped like a shallow bowl to arch above the pupilary surface of an eye and to peripherally contact an outer corneal surface thereof in a smoothly compounded transitional curved surface that conforms to an outwardly flattening curved surface of the cornea and to rise slightly in reverse curvature at the outer edge of the lens to permit the passage of tear fluid to and between the contacting areas of lens and cornea for moistening and lubricating purposes. The lens inner transitional curve must be smoothly continuous because the slightest malformation at this area can distress a wearer of the lens. The small overall size of a contact lens, its transparency, and the location of the crucially sensitive area in a concavity makes an adequate rapid inspection difficult and uncertain.

It is an object of the invention to provide a contact lens inspection device for viewing in profile an inner concave eye-contacting area of a contact lens.

Another object of the invention is to provide an inspection device for inspecting a concave peripheral surface of a transparent object by illuminating it to look at and not through said surface.

Still another object of the invention is to provide an inspection device for viewing in profile a near surface of a transparent object.

Other objects and a more complete understanding of the invention may be had by referring to the following specification in which.

Figure 1:
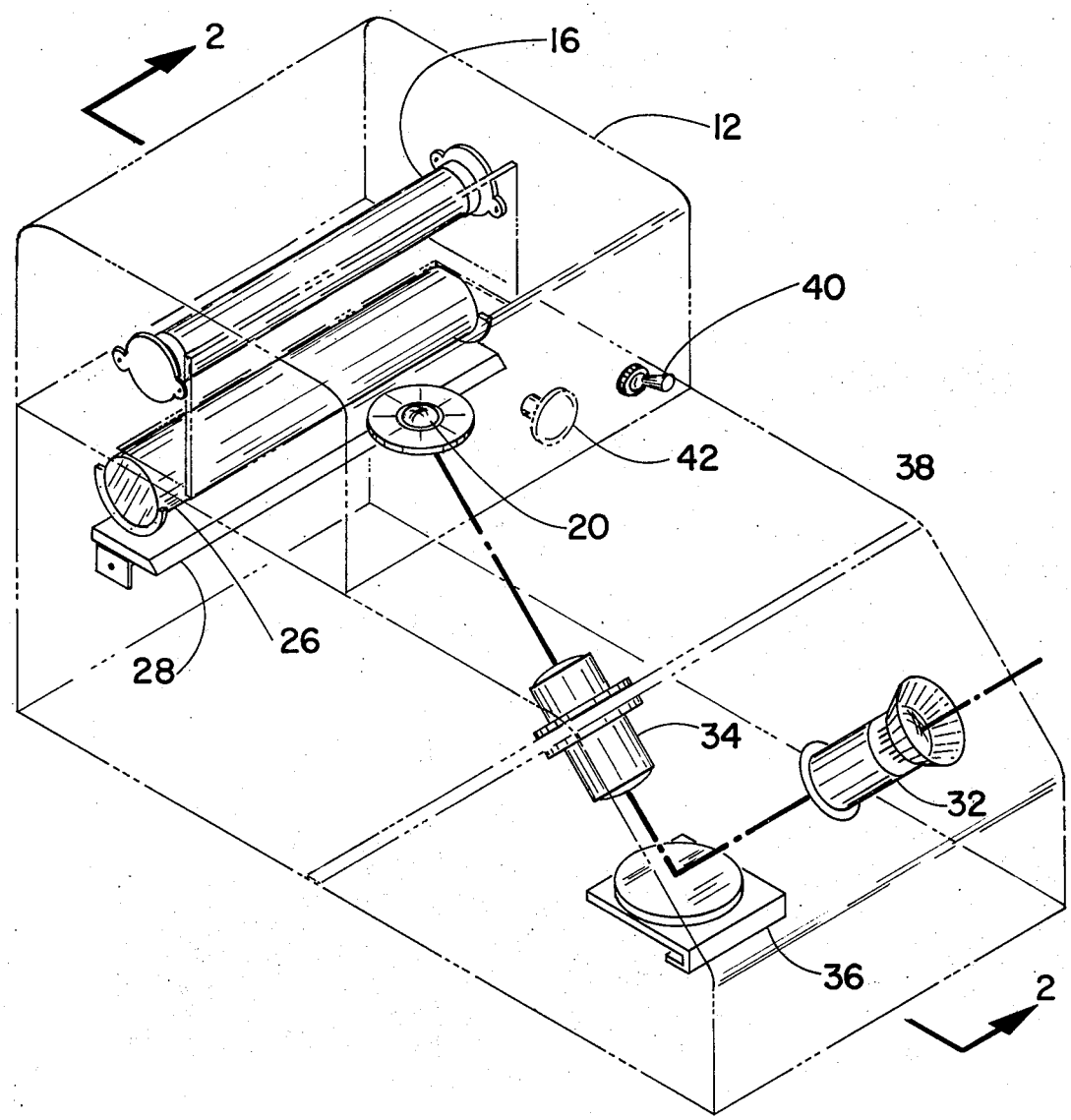
FIG. 1 is a perspective view of the invention with its closure in phantom.
Figure 2:
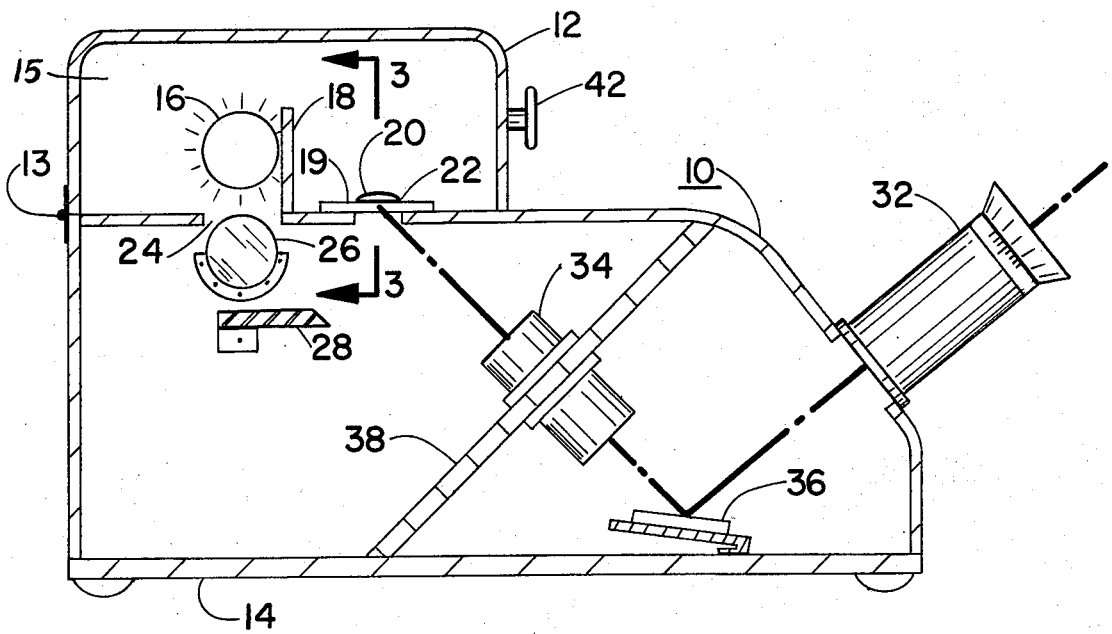
FIG. 2 is a cross sectional view taken along section line 2—2 of FIG. 1.

Referring to FIGS. 1 and 2, the invention comprises a closure 10 having a box type lid 12 connected by a hinge 13 to a base portion 14, said lid being adapted to swing upward about hinge 13. A light 16 is mounted in lid 12 between hinge 13 and the middle of lid 12 and between its upper and lower bounds. An opaque divider 18 is mounted on the top of base portion 14 extending upward into a chamber 15 defined by said lid 12 when closed, and shielding a transparent lens station 19 from direct illumination from light 16. Lens station 19 is defined in the top of base portion 14 also for supporting and centering a contact lens 20 resting on its base 22. An opening 24 is defined in the top of base portion 14 under light 16. A cylindrical lens 26 is mounted in said base portion 14 in and under opening 24 and diffuse illumination from light 16 into base portion 14. A light reflector 28 is mounted below cylindrical lens 26 and reflects light falling thereon slantingly upward through station 19 to base 22 of any contact lens 20 resting thereon. All interiors of closure 10 are painted dead black, except for white reflector 28, for absorbing and reducing reflections.

A focusable eye piece 32 is slantingly mounted over an opening in base portion 14, as shown in FIGS. 1 and 2. Objective lens tube 34 and a reflecting mirror 36 are mounted in base portion 14, the base portion being divided by a wall support 38 for said objective lens tube 34 for limiting illumination from light 16 to mirror 36 and eye piece 32 to that coming from an end of objective lens tube 34. The eye piece, mirror and objective lens tube are adapted to direct a line of sight to base 22 of contact lens 20 supported on inspection station 19 and illuminated dimly from above and comparatively brightly from below.

Figure 3:
FIGS. 3–5 are profile views respectively of three lenses as viewed through the illustrated optics along section line 3—3.
Figure 4:
Figure 5:
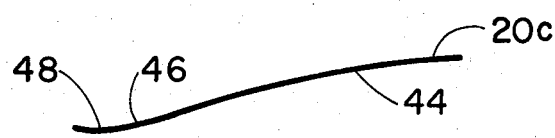

Referring to FIGS. 3–5, these figures show what an operator might see when he focused in successively on three contact lenses 20a, b and c. In all three of these lenses, base or central posterior curves 44 are seen in profile as the part arching above an eye pupil. In FIG. 3, secondary curve 46 and peripheral curve 48 are shown in profile to have sharp junctions that would cause irritation of the eye of a wearer. In FIG. 4, a secondary curve is missing and peripheral curve 48 is extended flatly and would cause discomfort to a wearer because of the malformation. In FIG. 5, a continuously is seen with smooth transition from curve to curve and could be worn with maximum satisfaction.

To operate the invention, the raised lid is lifted by a handle 42 and a contact lense 20 placed, base down, on transparent inspection station 19. The lid is closed and light 16 energized through operation of switch 40 from an outside source (not shown). Looking through eye piece 32, the line of sight established through intermediate magnifying optics is focused on contact lens base 22 and a portion of the eye contact area thereof which is highlighted by the dim background and bright foreground illumination. The slanting line of sight brings a portion of this contact area and the adjourning area into profile view; the combination of lighting and slanting line of sight enabling the operator and viewer to see said transparent inner areas or surfaces rather than seeing through them.

The above description has set forth the best embodiment known to the applicant for the purpose of making a complete disclosure thereof. A possible equivalent of the eye piece 32 is a screen similarly located in the base portion and on which the image of the concave surface could be projected by mirror 36 without departing from the spirit and principles of the invention

What is claimed is:

1. A device for inspecting eye-contacting surface of a transparent contact lens having a center axis and oppositely disposed curved outer surfaces and concave inner surfaces, said inner surfaces including peripherally said eye-contacting surface, said device comprising: opaque enclosure means for barring exterior illumination from entering; a transparent inspecting station mounted in said enclosure means for supporting a contact lens thereon for the separate illumination of said oppositely disposed outer and inner surfaces; lighting means mounted in said enclosure means adapted to dimly back light said outer surfaces and brightly highlight said inner surfaces of a contact lens supported on said inspecting station; and magnifying optical means mounted on and in said enclosure means and adapted in combination to provide a line of sight defining an angle with said center axis of a contact lens, supported on said inspection station, for slantingly and directly looking at, rather than through a portion of said peripheral eye-contacting surface to view it in profile, said optical means including eye-piece, reflector and objective elements.

2. A device for inspecting eye-contacting surface of a contact lens as described in claim 1 wherein said enclosure means comprises: exterior walls defining an enclosure adapted to be openable from the top to provide acces to said inspecting station; interior walls defining three chambers, one chamber being intermediate the other two which are respectively in vertical and horizontal alignment with said intermediate chamber; said vertically aligned chambers define two openings therebetween for respectively mounting said inspecting station in one of said openings, and a cylindrical lens under the other of said openings, said cylindrical lens for collecting and diffusing illumination from said lighting means; said horizontally aligned chambers defining an opening therebetween for mounting an objective element of said optical means in slanting alignment with said inspecting station, and for restricting illumination between said horizontally aligned chambers; said horizontally aligned chamber mounting said eye-piece element oppositely disposed from said objective element and slanting oppositely thereto to extend outwardly through an exterior wall, the optical axes of said eye-piece and said objective elements intersecting at said refelctor element mounted therebetween.

3. Enclosure means as disclosed in claim 2 wherein all interior surfaces of said enclosure are non-reflective.

4. Enclosure means as described in claim 2 wherein said lighting means is mounted over the other of said openings defined between said vertically aligned chambers; and a divider or free wall is mounted between said openings for shielding said inspecting station from direct illumination of said lighting means.

5. Enclosure means as described in claim 2 wherein the intermediate chamber mounts a deflector for deflecting illumination from said cylindrical lens upward to the inspecting station and shields the line of sight from direct illumination from said cylindrical lens.

6. Method of inspecting in profile a portion of peripheral surfaces of a small bowl-shaped, transparent object having oppositely disposed curved outer and inner surfaces, and comprising the steps of: dimly backlighting said outer surfaces; brightly highlighting said inner surfaces; and magnifying and viewing a peripheral portion of said surfaces at an angle with a center axis of the bowl-shaped object, whereby said portion is seen in profile rather than seen through in plan.

* * * * *